United States Patent [19]

Shahan et al.

[11] 3,760,859
[45] Sept. 25, 1973

[54] AIR PRESSURE CONTROL FOR DUAL TIRES
[75] Inventors: James F. Shahan, Tucson; Richard D. Hofmann, Paradise Valley, both of Ariz.
[73] Assignee: Dilar, Inc., Tucson, Ariz.
[22] Filed: Feb. 8, 1972
[21] Appl. No.: 224,538

[52] U.S. Cl. .................. 152/415, 137/113, 137/224, 152/427
[51] Int. Cl. .......................................... F16k 15/20
[58] Field of Search ..................... 152/41 T, 427; 137/224, 112, 118, 113

[56] References Cited
UNITED STATES PATENTS
2,004,822  6/1935  Mercier .............................. 137/224
3,664,362  5/1972  Weise .............................. 137/112 X FOREIGN PATENTS OR APPLICATIONS
259,632  1/1949  Switzerland .................. 152/415 DT Primary Examiner—Harold W. Weakley
Attorney—Charles G. Lyon et al.

[57] ABSTRACT

A device for equalizing the pressure in the pneumatic tires of a dual wheel assembly employs a valve shuttle which has three positions: (a) it isolates pressure in one tire, (b) it equalizes the pressure between the tires, (c) it isolates pressure in the other tire. A fill valve assembly has an element for holding the valve shuttle in position (b) so that the tire pressures are equalized during filling. Also, the valve shuttle closes by pressure differential in the case of a blowout or puncture of one of the tires, to prevent loss of pressure from the other tire. Furthermore, a pressure relief valve is provided to prevent overpressure in either of the tires.

9 Claims, 4 Drawing Figures

PATENTED SEP 25 1973 3,760,859
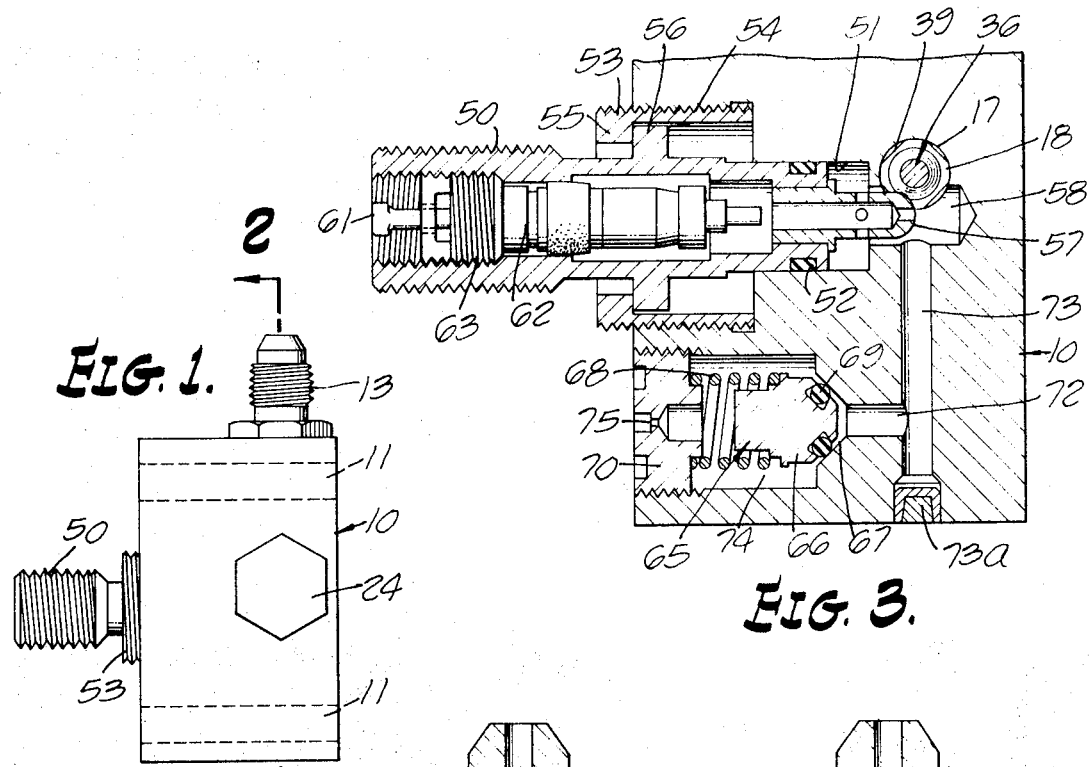
FIG. 1.
FIG. 3.
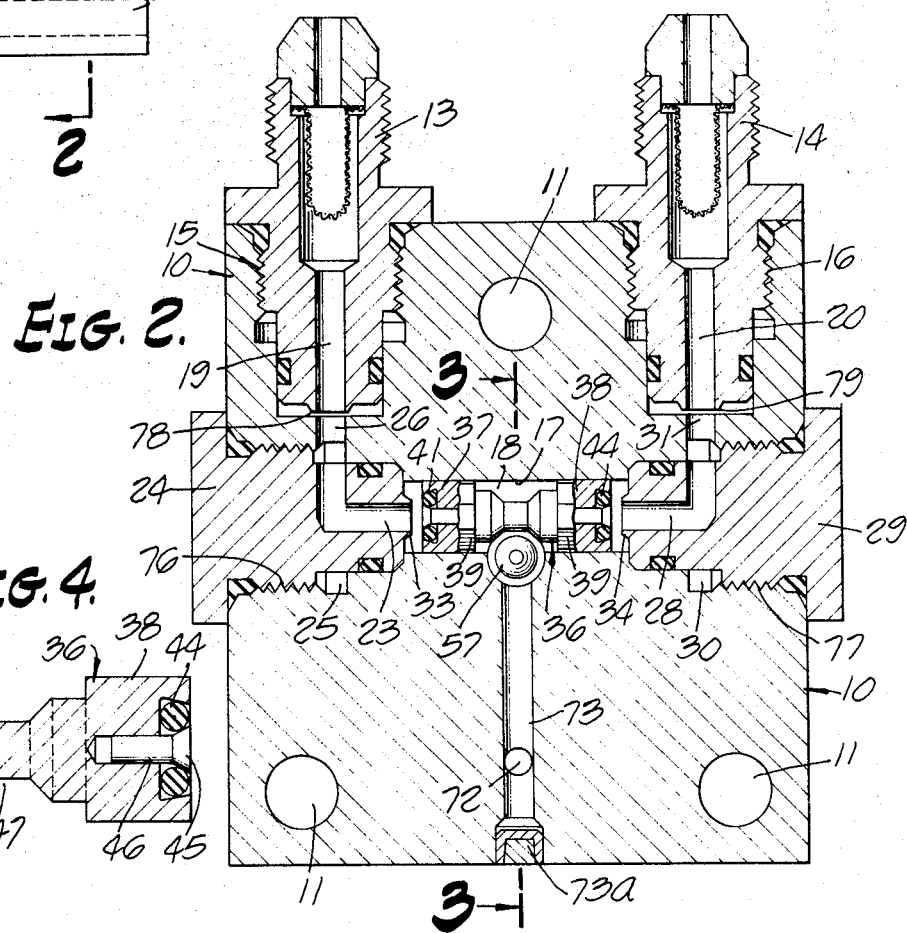
FIG. 2.
FIG. 4.

AIR PRESSURE CONTROL FOR DUAL TIRES

This invention relates to wheel assemblies having dual pneumatic tires and is particularly directed to a device to be mounted on the wheel assembly which acts to equalize the pressure of the pneumatic tires. During normal operation, and during filling, the device also acts in the case of a blowout or puncture of one of the tires to prevent loss of pressure in the other tire. A pressure relief valve protects against overpressure in either of the tires.

In off-the-road vehicles such as earth-moving equipment or mining trucks, wheel assemblies having dual pneumatic tires are commonly employed. The tires represent a heavy investment and it is important that each of the pneumatic tires on a dual wheel assembly carry the same pneumatic pressure, in order to prevent one tire from doing more than its share of the work. It is also important to prevent the loss of air from one tire in the event that the other tire in the dual assembly should rapidly lose air for any reason such as, for example, by a puncture or blowout. During the operation of filling the tires with air, it is important that the air pressure in the tires be equalized so that at the end of the filling operation no substantial pressure difference exists between the two tires. Furthermore, it is desirable to provide a relief valve which is effective to prevent overpressure in either or both tires, since the pressure may build up due to changes in ambient temperature and to changes in loading.

Other and more detailed objects and advantages will appear hereinafter.

In the drawings:

FIG. 1 is a side elevation showing a preferred embodiment of this invention.

FIG. 2 is a sectional elevation taken substantially on the lines 2—2 as shown in FIG. 1.

FIG. 3 is a sectional elevation taken substantially on the lines 3—3 as shown in FIG. 2.

FIG. 4 is a sectional view of the valve shuttle shown on an enlarged scale.

Referring to the drawings, the housing generally designated 10 is provided with openings 11 extending therethrough for reception of fasteners, not shown, for securing the housing to a wheel assembly having dual pneumatic tires. Duplicate terminal fittings 13 and 14 are secured by threads 15, 16 to the housing, and each of these terminal fittings is adapted to be connected by a conduit, not shown, to the stem of one of the dual pneumatic tires, respectively.

A central bore 17 in the housing provides a cavity 18 which communicates at one end with the passageway 19 in the terminal fitting 13 and communicats at the other end with the passageway 20 in the terminal fitting 14. Right angle passage 23 in the threaded plug 24 extends from the cavity 18 to an annular space 25 communicating by housing port 26 to the passageway 19. Similarly, right angle passage 28 in the threaded plug 29 extends from the cavity 18 to an annular space 30 communicating by housing port 31 to the passageway 20. A stationary valve seat 33 is provided on the plug 24 adjacent the cavity 18 and, similarly, a stationary valve seat 34 is provided on the plug 29 adjacent the cavity 18. From this description, it will be understood that the interior of one of the dual pneumatic tires communicates through passageway 19 and valve seat 33 with the cavity 18, and the interior of the other pneumatic tire communicates through passageway 20 and valve seat 34 with the cavity 18.

A double-ended valve shuttle 36 is provided with axially spaced cylindrical portions 37 and 38 interrupted by flats 39 (FIG. 3). These axially spaced portions slide within the bore 17. An O-ring 41 is mounted at one end of the valve shuttle 36 and held in place by the conical head 42 of a pin 43 pressed axially into place. Similarly, the other end of the shuttle 36 is provided with an O-ring 44 held in place by the conical head 45 of a pin 46 pressed axially into place. A groove 47 is formed in the valve shuttle 36 between the parts 37 and 38.

The valve shuttle 36 moves from a first position in which the O-ring 41 closes against the seat 33 through a second position shown in FIG. 2 to a third position in which the O-ring 44 closes against the valve seat 34. In the first position, the interior of one of the pneumatic tires is isolated from the cavity 18, and in the third position the interior of the other pneumatic tire is isolated from the cavity 18. When the valve shuttle 36 is in the second position as shown in FIG. 2, the passage 28 communicates through cavity 18 with the passage 23 through the spaces created by the flats 39 on the valve shuttle parts 37 and 38. Accordingly, when the valve shuttle 36 is in the second position, the pressure in the dual pneumatic tires is equalized.

Should the pressure in one of the pneumatic tires drop by more than about 2 psi with respect to the pressure in the other tire, the valve shuttle is moved axially in the bore 17 by differential pressure to close the passageway leading to the tire with the lower pressure. Accordingly, in the case of a blowout or puncture of one of the tires, the valve shuttle 36 acts as a check valve to prevent loss of pressure in the other pneumatic tire.

Means are provided on the housing for filling both pneumatic tires simultaneously and for insuring that the pressures remain equalized during the filling operation and at the close thereof. As shown in the drawings, this means includes a fill valve plunger 50 slidably mounted in a transverse bore 51 in the housing 10. An O-ring 52 prevents leakage. A nut 53 connected to the housing by threads 54 contains an internal shoulder 55. A flange 56 on the plunger 50 engages this shoulder to limit outward movement of the plunger under force of air pressure in the chamber 18. The plunger 50 is tubular and its inner end 57 projects into a bore 58 which intersects the housing 17. The rounded nose portion 57 on the plunger 50 engages within the groove 47 on the valve shutter 36 when the plunger 50 is moved in a direction to separate the flange 56 from the stop shoulder 55. The plunger 50 is moved either by manual force applied to its projecting end or by force of a conventional air hose terminal applied to its projecting end. Such air hose terminal has a central part which contacts the valve stem 61 of a conventional Schrader-type tire valve 62 mounted within the plunger 50 and held in position by threads 63. The normal application of the air hose terminal to the projecting end of the plunger 50 results in longitudinal inward movement of the plunger, and this causes the rounded nose portion 57 to center the valve shuttle 36 in its middle position.

A relief valve generally designated 65 includes a valve head 66 mounted to move against a valve seat 67 on the housing 10 under force of the coil compression spring 68. An O-ring 69 on the valve head contacts the seat 67 to prevent leakage. An adjusting nut 70 is threaded into the housing 10 and holds the spring 68 under compression between the valve head 66 and the nut 70. Passages 72 and 73 connect the valve chamber 74 with the bore 58 which intersects the cavity 18. Accordingly, overpressure in the cavity 18 causes the valve head 66 to move away from the seat 67 against the action of the spring 68, to vent excess pressure from the cavity 18 to atmosphere through the restricted port 75 in the plug 70. The passage 73 is closed at one end by means of the plug 73a.

As a design feature, the threads 15, 16 on the terminal fittings 13 and 14 are proportioned so that they may be engaged with the housing threads 76, 77 which receive the plugs 24, 29. In other words, the plugs 24 and 29 and the terminals 13 and 14 are interchangeable in position with respect to the housing. This provides for flexibility in geometrical positioning of the terminals 13 and 14 with respect to the housing 10. For this reason, seats 78 and 79 are provided on the terminals 13 and 14 so that they may co-act with the 0-rings 41 or 44 on the valve shuttle 36, in the event that one or both of the terminals 13, 14 are interchanged with the plugs 24 or 29.

Having fully described our invention, it is to be undersood that we are not to be limited to the details herein set forth but that our invention is of the full scope of the appended claims.

We claim:

1. For use with a wheel assembly having dual pneumatic tires, the improvement comprising, in combination: a housing adapted to be mounted on the wheel assembly, means including separate passage means in the housing for establishing separate passageways communicating with the interior of each of the pneumatic tires, valve means including a movable valve element within said housing acting to close either of said passageways or to establish communication between them, a fill valve assembly mounted for axial movement on said housing for pressurizing said dual tires through said passageways, said assembly including a fill valve, means on the movable fill valve assembly for holding said movable valve element in position to establish communication between said passageways, whereby the tire pressures are equalized during filling, and means whereby said assembly is normally maintained in a retracted position to permit free movement of said valve element.

2. The combination set forth in claim 1 wherein said valve means includes a pair of spaced co-axial valve seats in the housing and wherein said movable valve element comprises a valve shuttle movable axially to close against either valve seat.

3. In a wheel assembly having dual pneumatic tires, the improvement comprising, in combination: a housing mounted on the wheel assembly, means including separate passage means in the housing establishing separate passageways communicating with the interior of each of the pneumatic tires, valve means including a movable valve element within said housing acting to close either of said passageways or to establish communication between them, a fill valve assembly mounted for axial movement on said housing for pressurizing said dual tires through said valve means and said passageways, said assembly including a fill valve, means on the movable fill valve assembly for holding said movable valve element in position to establish communication between said passageways, whereby the tire pressures are equalized during filling, and means whereby said assembly is normally maintained in a retracted position to permit free movement of said valve element.

4. The combination set forth in claim 3 wherein said valve means includes a pair of spaced co-axial valve seats in the housing and wherein said movable valve element comprises a valve shuttle movable axially to close against either valve seat.

5. For use with a wheel assembly having dual pneumatic tires, the improvement comprising, in combination: a housing adapted to be mounted on the wheel assembly, means including separate passage means in the housing for establishing separate passageways communicating with the interior of each of the pneumatic tires, valve means including a valve element within the housing movable from a first position closing one of said passageways through a second position establishing communication between said passageways to a third position closing the other of said passageways, said valve element being movable by differential pressure to said first or third position to retain pressure in one tire in the event of loss of pressure from the other tire, a fill valve assembly mounted for axial movement on said housing for pressurizing said dual tires through said valve means and said passageways, said assembly including a fill valve, means on the movable fill valve assembly for maintaining said movable valve element in said second position, whereby the tire pressures are equalized during filling, and pneumatic pressure operated means for moving said fill valve assembly to a retracted position to permit free movement of said valve element.

6. The combination set forth in claim 5 in which said movable valve element comprises an axially movable valve shuttle.

7. The combination set forth in claim 6 in which said means on the fill valve assembly includes a plunger slidably mounted on the housing and accessible for movement manually to engage said movable valve shuttle.

8. For use with a wheel assembly having dual pneumatic tires, the improvement comprising, in combination: a housing adapted to be mounted on the wheel assembly, means including separate passage means in the housing for establishing separate passageways communicating with the interior of each of the pneumatic tires, the housing having an internal cavity communicating with said separate passage means, axially spaced valve seats each positioned between said cavity and one of said separate passage means, respectively, a valve shuttle in said cavity axially movable to close against either valve seat or to establish communication between them, a fill valve assembly mounted for axial sliding movement on said housing for pressurizing said dual tires through said cavity and said passageways, said assembly including a fill valve, means on the movable fill valve assembly for holding said movable valve shuttle in position to establish communication between said passageways, whereby the tire pressures are equalized during filling, and means actuated by pneumatic pressure in said internal cavity for moving said fill valve assembly to a retracted position to permit free movement of said valve element.

9. The combination set forth in claim 8 in which the fill valve assembly has a part movable into a groove on the valve shuttle to hold it against axial movement.

* * * * *